United States Patent Office 3,014,796
Patented Dec. 26, 1961

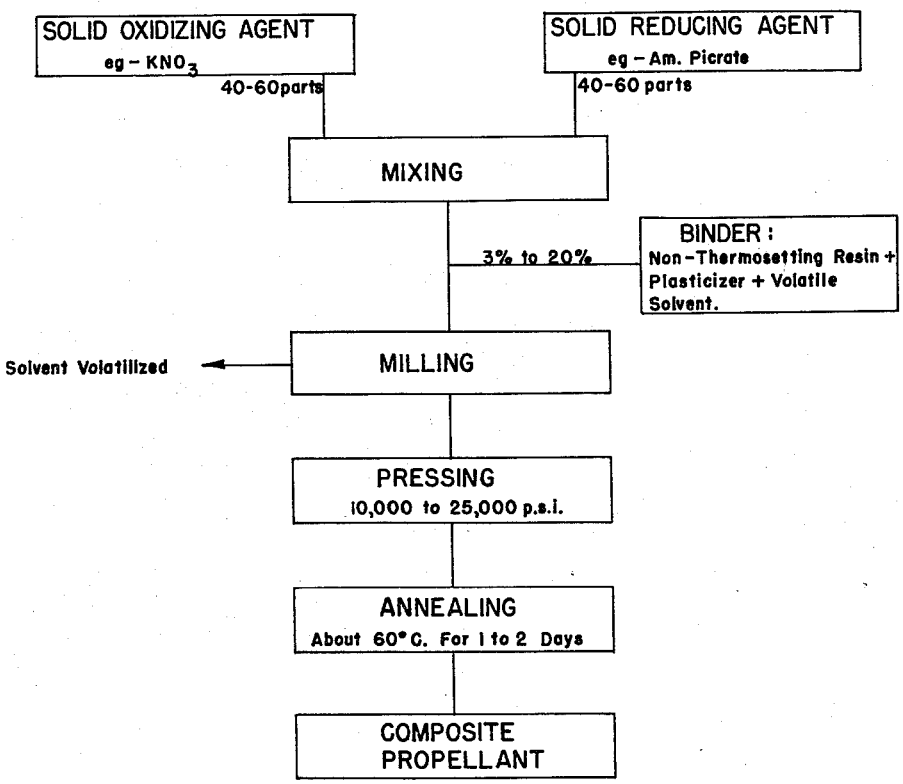
FRANKLIN A. LONG
WILLIAM M. HUTCHINSON
CHARLES A. THOMAS   INVENTORS

3,014,796
SOLID COMPOSITE PROPELLANTS CONTAINING CHLORINATED POLYPHENOLS AND METHOD OF PREPARATION
Franklin A. Long, Pittsburgh, Pa., and William M. Hutchinson and Charles A. Thomas, Dayton, Ohio; said Long and said Hutchinson assignors to the United States of America as represented by the Secretary of War; said Thomas assignor to Monsanto Chemical Company, St. Louis, Mo.
Filed Aug. 22, 1945, Ser. No. 612,134
4 Claims. (Cl. 149—19)

The present invention relates generally to gas generating compositions and more particularly to a new and improved propellant suitable for the production of a high velocity gas jet, the reactive effect of which may be employed for the propulsion of rocket projectiles, for assisting the take-off of aircraft, gliders, flying bombs, etc., or for other jet propulsion purposes.

As more fully described in the copending application of Hammett and Thomas, Serial No. 550,905, filed August 23, 1944, now abandoned, a propellant suitable for jet propulsion purposes should be characterized by a combination of properties that may be regarded as the fundamental prerequisites for satisfactory jet propulsion performance. These basic properties include the following:

(1) A high "specific impulse," i.e., a high impulse (force-time integral) imparted to the rocket per unit weight of propellant consumed;

(2) Reproducible internal ballistics, i.e., a burning rate that deviates only slightly, if at all, from the so-called "burning law" which may conveniently be expressed in the form $R \propto P^n$, where R is the rate of burning, P is the steady state pressure in the rocket motor and $n$ is a number less than unity.

(3) A low value of the exponential constant $n$ in the burning law, corresponding to a low dependence of burning rate on the pressure existing in the rocket motor; and (4) A low temperature coefficient of pressure change when a fuel of given grain size, at various pre-ignition temperatures, is fired in a given motor.

There are many other properties that are desirable in a rocket fuel, for example, high loading density, high mechanical strength, moderate motor chamber requirements, etc., but the four basic properties listed above are of controlling importance if reliable performance under a wide range of climatic conditions is to be obtained.

Prior to the development of composite propellants, no rocket fuel was available that met the above prerequisites. Thus ballistite, perhaps the most widely used rocket propellant at the present time, while satisfactory in respect to specific impulse and conformance to the burning law, has a large exponential constant $n$ (about 0.73), corresponding to a high dependence of burning rate on pressure; and a high temperature coefficient (about 1.5%/° C.) corresponding to a high dependence of burning rate on the pre-ignition temperature. As a result, reproducible results over a wide range of climatic conditions are practically impossible to obtain when ballistite is used as the rocket fuel.

In this and other respects the composite propellants described and claimed in the above indicated Hammett and Thomas application represent a significant improvement in fuels designed for jet propulsion uses. These composite propellants consist of a compacted mass of finely divided particulate gas generating materials bonded together by an inert, thermosetting resinous binder, which (because of its essentially inert character) is used in an amount merely sufficient to impart the desired degree of mechanical strength and rigidity to the composition. Such propellants are prepared by incorporating a small proportion of uncured thermosetting resin (e.g., ureaformaldehyde) with the particulate materials, compressing the resulting powdery composition under considerable pressure into grains of suitable shape and then curing the grains after removal from the mold. The finished grains are characterized by a high specific impulse, very low deviation from the burning law, a low exponential constant (less than 0.5) and a low temperature coefficient (ca. 0.3%/° C.).

The molded composite propellants of the type described above constitute the first rocket propellant fuels that met the four basic prerequisites for satisfactory rocket performance. It has been found, however, that composite propellants of the type described in the above-identified Hammett and Thomas application are characterized by certain disadvantages which not only cause difficulties during manufacture but also restrict the field of utility of the finished product.

In the first place, during manufacture of such propellants, the molding operation is rather critically dependent upon the content of binder-solvent in the powder. Thus, if the total volatile content of the molding powder is below about 0.9%, the powder presses poorly, whereas if it exceeds about 1.2%, the grains produced therefrom do not cure well. The low volatility of the binder-solvent (butanol) together with that of the thinner (xylene) used in the manufacture of such propellants requires an excessively long milling time to meet these critical specifications, which require rigid control measures. Furthermore, it has been found that after the molding step, the binders heretofore used set up very slowly, requiring about eleven days at about 60° C. for sufficient cure to produce a grain that is free of further dimensional change.

Another difficulty, which restricts the field of utility of the finished product, arises from the fact that the sensitivity of such grains to thermal shock is so great that large dimensional grains have a pronounced tendency to disintegrate when subjected to an abrupt temperature change. As a result, satisfactory "giant grains" of the type required for assisted take-off applications, etc., cannot be reliably produced according to the procedure described in said Hammett and Thomas application.

Broadly stated, the object of the present invention is to provide a new and improved rocket fuel that possesses all the significant advantages of a composite propellant of the type described in said Hammett and Thomas application but which obviate its more significant disadvantages and limitations, as briefly mentioned above.

A more particular object is the provision of a molded composite propellant that requires a shorter, more readily controllable milling time, a shorter cure period and which results in the production of grains of improved properties.

Another specific object is the provision of a composite propellant of low temperature coefficient and of improved stability to thermal and mechanical shock.

A still further object is the provision of a fast-burning molded composite propellant characterized by (a) A high specific impulse;
(b) Readily reproducible ballistics;
(c) Low dependence of burning rate on pressure and temperature;
(d) High loading density;
(e) Improved resistance to impact shock;
(f) Low dependence of physical properties (including compression strength) upon temperature over the range from −40° C. to +60° C.; and
(g) Improved stability of both large and small dimensional grains to thermal shock.

Another object is to provide an improved process for the manufacture of molded composite propellants having the foregoing properties.

Additional objects and advantages of the present invention will become apparent as the description progresses.

The foregoing objects may be accomplished in accordance with the present invention which is based, in part, upon the discovery that an improved molded composite propellant may be prepared by substituting one or more non-setting resins for the cross-linking thermosetting resins heretofore employed as the binder in composite propellants of this type.

More specifically, we have found that the principal disadvantages and limitations of the prior art compression-molded composite propellants may be obviated and at the same time many of their more important advantages may be retained, by substituting certain non-setting resins (with or without supplementary resin-modifying agents etc.) for the thermosetting resinous binders heretofore employed in fuels of this type. The rocket fuels of the present invention are, therefore, molded composite propellants comprising two primary components; namely, (1) a particulate, non-plastic gas-generating composition or "filler"; and (2) a binder comprising a non-setting resin, employed preferably in an amount merely sufficient to impart the desired degree of mechanical strength to the resulting grain.

For purposes of convenience, these two major components will be discussed separately below.

THE GAS GENERATING COMPONENT OR "FILLER"

The gas-generating component or filler in accordance with the present invention consists of finely divided solid composition that is capable of rapid reaction under the influence of heat and pressure to produce a large volume of gaseous reaction products. Compositions of this type preferably comprise a particulate or finely divided solid oxidizing substance and a particulate or finely divided solid oxidizable or reducing substance. The oxidizing substance may comprise one or more solid (e.g. crystalline) inorganic oxidizing agents such as the nitrate or perchlorate salts; for example, sodium nitrate, potassium perchlorate and the like. The oxidizable substance or reducing agent desirably comprises one or more solid (e.g. crystalline) organic nitro compounds or their salts, such as the sodium or preferably the ammonium salts of the polynitrophenols (for example, ammonium picrate); or one or more solid nitramines (for example, nitroguanidine).

In general, the oxidizable substance and the oxidizing substance may be employed in a wide range of proportions, depending on the particular use to which the ultimate fuel is to be put. In some instances it may be desirable to use these two filler-components in the proportions required for the production of $CO_2$ and $H_2O$ (i.e., a so-called "zero oxygen balance"). In the case of ammonium picrate-sodium nitrate mixtures for instance, this result is attained with a weight ratio of 47.5 to 52.5 respectively. However, for other purposes, a different specific impulse or a different burning rate may be desirable, in which case the relative proportions of the components may be considerably altered with a view to modifying one or more properties of the fuel. Thus, for example, for aircraft take-off purposes or for other uses where a low rate of burning may be desirable, a 10–90 metal nitrate-ammonium picrate composition may be satisfactory, whereas for anti-aircraft rockets or other purposes where a high rate of burning may be desirable, a 50-50 mixture of these same components may be preferable.

Generally speaking, in the case of ammonium picrate-metal nitrate mixtures, it is undesirable to employ in excess of about 60% metal nitrate, since a further increase in this component increases the solid reaction product (the corresponding metal carbonate) at the expense of the gaseous products, thereby cutting down the power of the propellant. A high specific impulse will be obtained with mixtures containing from about 10 to about 60% metal nitrate.

In some instances it may be desirable to employ ammonium nitrate in addition to a metal nitrate as the oxidizing component of the composition, inasmuch as the incorporation of ammonium nitrate tends to increase the specific impulse of the resulting fuel. However, the presence of ammonium nitrate in large amounts usually should be avoided since it is likely to produce compositions that are undesirably difficult to ignite and somewhat irregular in burning characteristics. Moreover the density change which occurs at the 32° C. transition temperature of ammonium nitrate tends to create strains in grains prepared therefrom, resulting in the development of cracks. However the addition of a small amount of ammonium dichromate tends to improve the ignitability and burning characteristic of grains containing ammonium nitrate, and the incorporation of a small amount of magnesium oxide in the ammonium nitrate (while the latter is in the molten state) tends to minimize difficulties arising from the 32° transition temperature. In any event, even without such adjuncts, a 50–25–25 mixture of ammonium picrate, sodium nitrate and ammonium nitrate may be used to produce a grain of high specific impulse, which is also easily ignitable and regular in burning characteristics.

In other cases it may be desirable to incorporate small amounts of other materials in the gas-generating composition, in order to modify one or more characteristics of the molding powder or of the finished propellant. Thus a small amount of a readily combustible material such as aluminum powder, charcoal, sulfur and the like, may be added for the purpose of modifying the burning properties of the fuel.

By using materials other than ammonium picrate and sodium or potassium nitrate, somewhat higher values of the specific impulse may be obtained in some cases. Thus a propellant containing a filler of 60–40 nitroguanidine-potassium perchlorate has a specific impulse only 10 percent lower than ballistite and because of its higher density their specific impulses per unit volume are almost identical.

For many applications, the use of potassium nitrate (instead of sodium nitrate) as the oxidizing compound of the filler offers several advantages. In the first place, the potassium salt has the lower hygroscopicity. Thus at ordinary temperatures, potassium nitrate (technical grade) deliquesces at a relative humidity of 90 percent, whereas sodium nitrate (technical) deliquesces at a relative humidity of 65 percent. Since the hygroscopicity of a picrate-nitrate propellant results almost entirely from the nitrate, this difference permits considerably greater freedom in the handling of propellants made with potassium nitrate.

In the second place propellants made with potassium nitrate show a definitely smaller value of the burning exponent, $n$, than do propellants made with sodium nitrate, and this is of course a favorable factor. In the third place, with the same binder, the same oxidizing agent and reducing agent ratio and the same size of nitrate, a propellant containing potassium nitrate usually burns slightly faster than one containing sodium nitrate. A more important factor is that a decrease in the particle size of the potassium nitrate causes a considerable increase in burning rate, whereas a change in the particle size of sodium nitrate has only a slight effect.

In studying the influence of initial potassium nitrate particle size on the $K_{2000}$ of a specific propellant composition, the specific surface in square centimeters per gram ($S_W$) provides a convenient size parameter. The values of this specific surface as given below are not very precise, since they have been experimentally obtained by combining screen analyses with a Fisher sub-sieve analyzer for the smallest fractions. However, the analytical method used was the same for all sizes and the values given for $S_W$ are undoubtedly proportional to the true values. To illustrate the extent of the particle size variation, 94% of a material of $S_W=2000$ will pass through a No. 325 screen whereas for a material with $S_W=500$, about 42% will stay on a No. 170 screen, about 72% will stay on a No. 325 screen and only 28% will pass through the No. 325 screen.

In one particular series of powders it was found that a change in $S_W$ of from 500 to 2000 caused a 40 percent decrease in $K_{2000}$ and of course a corresponding increase in burning rate. Since this range of particle size can be easily produced in a micropulverizer, the particle size effect is a considerable one. It is advantageous in that it offers another method of varying the burning rate, and in particular, it allows considerably higher rates to be obtained than are possible with sodium nitrate. At the same time, it does imply, of course, that close particle size control of potassium nitrate is an important item in obtaining a reproducible material.

The most important single variable for control of the burning rate or restriction ratio of molded composite propellants is the ratio of reducing agent (e.g., ammonium picrate) to oxidizing agent (e.g., potassium nitrate) in the filler. The importance of this factor may be illustrated by a series of propellants made with 9% of a given non-setting binder, with potassium nitrate of $S_W=500$ and with ammonium picrate, the only variable being the ratio of picrate to nitrate. For this series of powders, the burning rate and $K_{2000}$ was found to change by a factor of five as the percentage of picrate in the filler changed from 45 to 90 percent. This large change combined with the smaller changes obtainable by variations in percent binder, in nitrate particle size and in motor pressure, makes it easily possible to obtain powders having burning rates ranging from 0.12 to 2 inches per second at 2,000 p.s.i.

THE BINDER

A large number of non-setting resins may be used, either alone or in combinations with other non-setting resins and/or resin-modifying agents, as the binders in accordance with the present invention. These resins may conveniently be classified as (1) non-setting thermoplastic resins, and (2) non-setting resins of the elastomer or rubber-like type.

The first subclass may be exemplified by various cellulose derivatives (e.g. the cellulose acetates, nitrates and alkyl ethers); polyvinyl alcohol derivatives (e.g. polyvinyl acetate); the simple and modified alkyd resins (e.g. oleic acid modified glycerol-phthalic acid alkyds); the various phenol-aldehyde resins; and the like.

The second subclass may be illustrated by the various natural and synthetic rubbers or elastomers, for example, plasticized natural rubber, degraded natural rubber, cyclized rubber, low molecular weight polyisobutylene rubber, neoprene chlorinated rubber and the like.

The propellants made from these two classes of binders exhibit important differences in specific properties, depending on the nature of the particular binder selected. Generally speaking, however, regardless of the particular nonsetting resin selected, the propellants prepared in accordance with the present invention are characterized by a degree of resistance to the thermal shock, such that large dimensional grains will withstand thermal shock of a severity which would shatter similar-sized grains of composite propellant prepared with a thermosetting resinous binder. Furthermore, certain preferred embodiments of the present invention, for instance, propellants prepared from the elastomeric binders are characterized by certain additional advantages over and above the class characteristics mentioned above. Such grains, for example, are not brittle at low temperatures (e.g. $-40°$ C.) whereas other types of molded composite propellants shatter under compression stress at such temperatures. Furthermore the compression strengths of such grains at high temperatures (e.g. 60° C.) are greater than that of all other types of molded composite propellants, even at room temperature.

Generally speaking, in order to obtain the most satisfactory binders, the selected nonsetting resin is preferably plasticized with a non-volatile resin-solvent, thereby producing a composition that is softer and more tacky than the original resin. The proportion of plasticizer used may vary from about 20% to about 80% of the weight of the resin, depending on the stiffness or hardness of the resin itself, the effectiveness of the particular plasticizer selected, and other factors.

The use of plasticizers for resins is advantageous for several reasons. In the first place, the molding properties of the molding powder may be varied over a very wide range by changing the resin-plasticizer ratio of the binder, all other factors remaining unchanged, and this affords a convenient control variable for use during fabrication of the present propellants. In the second place, in some instances the plasticizer profoundly improves the "dimensional stability" of grains made with various specific resinous binders, with the result that internal strains within the molded grain are minimized and a very much shorter annealing period may be used to produce a high quality product.

In order to avoid adversely affecting the internal ballistics of the propellant, a restricted amount of binder should be employed; namely, an amount of resin merely sufficient to enable the production of a mechanically strong grain. Usually from 5 to 10% by weight of binder in the finished grain is sufficient to insure the desired mechanical properties without adversely affecting the burning characteristics of the composition. In some cases, as little as 3% of binder may be satisfactory.

The effect of the binder on the burning rate merits a brief discussion at this point. All binders appear to cause a decrease in the burning rate of molded composite propellants and for small percentages of binder this decrease usually varies linearly with the binder percent. As an example, in one series of tests with a given filler composition and a given binder, a change of binder percent from 5 to 9 caused a 20 percent decrease in burning rate. Results with other binders showed roughly the same effect. In addition, the nature of particular binder selected has a considerable effect on the burning rate. Indeed, with a given filler composition and a given binder percentage, a change in the nature of the binder in some cases may result in a 20 percent change in burning rate.

CHARACTERISTICS OF SPECIFIC BINDERS

As indicated above, the propellants of the present inventions, as a class, are characterized by numerous advantageous properties, some of which have been mentioned. It was also pointed out, however, that various specific embodiments exhibit advantageous properties in addition to their common class characteristics. For this reason it may be helpful to consider in detail some of the specific resinous binders in accordance with the present invention. In this discussion, in order to avoid unnecessary repetition, the common or class characteristics will not be mentioned, except insofar as differences in degree may be noteworthy.

CELLULOSIC RESINS

Of the various cellulosic resins that have been investigated, cellulose acetate is perhaps the least attractive because it requires high percentages of polar plasticizers to give the desired consistency, and such plasticizers in many cases have an appreciable capacity for dissolving some of the various filler components, e.g. ammonium picrate. This phenomenon may be one cause of dimensional instability in grains.

The most satisfactory cellulose nitrate investigated was one possessing a Saybolt viscosity of ¼ second (10.8–11.1% nitrogen). Higher viscosity resin required more plasticizer and more solvent. "Santicizer 8" (a mixture of ortho and para toluene ethyl sulfonamide sold by Monsanto Chemical Co.) appears to be one of the best plasticizers for the cellulose nitrates. A typical binder composition is 40% cellulose nitrate, 55% "Santicizer 8" and 5% Centralite (dimethyl-diphenyl-urea). Solid explosives such as bis(nitroxyethyl) nitramine ("DINA") and tetramethylol cyclopentanone tetranitrate ("Fivonite") can be used as plasticizers for celllulose nitrate if a small percentage (10–20%) of a liquid plasticizer is also added.

Generally speaking powders which contain plasticized cellulose nitrate as binder are somewhat more sensitive to impact than powders containing other resins, this being especially true of 10–15% binder compositions. Since it is not superior to other binders in the specific impulse and the burning rate of its powder, other resins are generally preferable as binders.

Ethyl cellulose was found to be the most suitable cellulosic resin investigated. It is fairly non-polar and quite non-polar plasticizers can be used. Indeed ethyl cellulose of 7 centipoise viscosity (e.g., "Ethocel N–7") constitutes one of the preferred embodiments of the present work, particularly when this resin is used in conjunction with one or more chlorinated di- and ter-phenyls marketed under the trade name of "Aroclor." As a matter of convenience these preferred embodiments will hereinafter be referred to as "ECA" and "ECAS," these letters representing Ethyl Cellulose-Aroclor and Ethyl Cellulose-Aroclors, respectively.

One of the outstanding advantages of ECA and ECAS is the very good dimensional stability of grains prepared from either of these binders. This is thought to be due at least in part to the "Aroclor" since ethyl cellulose with other plasticizers show two to five times as much dimensional change during annealing. Another attribute of Aroclor is that it does not attack restrictive coatings on grains. An advantage in some applications is that ECAS powders are as fast or faster burning than any other powders containing non-setting binders.

One possible disadvantage of "Aroclor" as a plasticizer is that it must be present in a relatively large percentage in binders. Thus ECAS contains only 20% resin and this allows its viscosity to change considerably with temperature. This is not serious in the region below room temperatures, since the resin prevents the "Aroclor" from becoming brittle at −40° C. However, at 60° C. this binder softens sufficiently to cause the compression strength of ECAS grains at 60° C. to drop to about ⅓ its value at 25° C. ECA is somewhat stiffer than ECAS and changes less with temperature. However, the softening of the binder at 60° C. has no apparent effect on the burning of either ECA or ECAS grains at this temperature.

In producing grains of very large diameter (e.g. 8½" or more) a molding powder with less flow may be desirable in some instances. This may be obtained by increasing the amount of ethyl cellulose in the binder and decreasing the amount of plasticizer. This illustrates an advantage of this type of binder wherein the molding properties of the powder can be varied over a very wide range by changing the resin-plasticizer ratio.

POLYVINYL RESINS

A low viscosity polyvinyl acetate (e.g. "Vinylite AYAA" of the Carbide & Carbon Chemical Corp.) appears in some ways to be an ideal binder. It requires only about half as much plasticizer as ethylcellulose to give the same consistency. However, grains containing polyvinyl acetate in general do not have as satisfactory dimensional stability and burning qualities as do those prepared for ECA for example. Furthermore, powders containing polyvinyl acetate do not mill as well or as quickly as those containing ECA or ECAS.

"Butvar," a polyvinyl acetate butyral, made by the Monsanto Chemical Co. is a hard, tough resin, which is best used in solution in methanol or ethanol, thinned, if desired, with toluene. The most efficient "Butvar" plasticizers investigated were dibutyl tartrate and a dimethyl amide of a synthetic fatty acid similar to stearic acid, sold as "Plasticizer 35," by the Resinous Products and Chemical Corp., the former of these giving a more tacky mixture. The chief advantages of polyvinyl acetate butyral are the small change in its physical properties with temperature and its shock resistance. Because of these factors grains made of "Butvar" have higher impact strength and less change in compression srtength with temperature than do grains containing ECAS. Its disadvantages are the somewhat less satisfactory dimensional stability of its grains and difficulty in milling.

ALKYDS

Although alkyds are generally thermosetting, there are certain available non-setting alkyds suitable for use as binders. Thus five percent of "Glyptal ZV3202" (a General Electric Co. non-setting alkyd) may be used successfuly as a binder and its grains are superior to ECA grains in compression strength at 60° C.

PHENOLIC RESINS

A two stage non-setting, acid catalyzed phenol-aldehyde syrup sold by the Catalin Corporation under the trade name "Novalak" may be used as a binder for grains to be used in special applications where it may be advantageous for the grains to continue burning after being ejected from a firing chamber. No hardening agent need be employed with this resin which therefore remains plastic even on prolonged heating at 60° C. "Santicizer M–17" (a methyl phthalyl ethyl glycolate sold by the Monsanto Chemical Co.) and "P.H.O." (a para cumarone-indene-phenol polymer sold by the Neville Co.) may be used to soften the "Novalak." Of these "Santicizer M–17" appears to be more efficient but "P.H.O." may give better pressing.

RUBBERS

In general, the rubber binders are superior to all other types of binders in the small effects of temperature on the properties of grains containing them. This is most noticeable in the compression strength measurepropellants, but these strengths change very little from ments; not only do these grains have strengths at 60° C. about twice as high as the prior art molded composite +60° to −40° C. These qualities may decrease power loss in rocket fuels and increase the resistance to thermal shock in large grains. The rubber binders, however, as a rule are somewhat more difficult to use than other non-setting binders, although such difficulties may be minimized by suitable expedients.

The difficulties alluded to above appear to arise from the fact that an increase in the mean molecular weight of an elastomer generally increases both its "nerve" (i.e., resistance to shear) and its viscosity when in solution, and also decrease its adhesiveness or "tack." These difficulties may, however, be overcome by several expedients.

(1) Starting with a tacky, fairly high molecular weight natural rubber, the "nerve" may be decreased and at the same time the softness and tack may be increased by means of a plasticizer. The plasticizer acts as a solvent when the binder is in solution, so that higher solids content can be obtained than with the rubber alone. This type of binder gives good results probably by virtue of its extreme tack, since it is still "nervy."

(2) Use a degraded rubber. Natural rubber is better than GR–S (a copolymer of butadiene and styrene containing about 25% of copolymerized styrene) in this respect since it has more tack. Heavily degraded GR–S is satisfactory in low percentage binder compositions since in obtaining tack and low "nerve" by degradation, the rubber tends to become greatly softened.

(3) Use cyclized rubber which generally is much harder than the usual rubber and is practically devoid of "nerve." It also tends to form less viscous solutions; some cyclized natural rubbers form solutions of 30% solids that are not as viscous as 10 or even 5% solutions of other rubbers. All this is very advantageous for a binder. Cyclized rubbers are almost devoid of tack but this can be readily developed by use of suitable plasticizers.

(4) Use synthetic low-polymer, elastomeric materials that are characterized by low "nerve." These are generally too soft to be used in large proportion without modifying agents such as stiffeners. One type of stiffener that is especially useful is carbon black. These synthetic low polymer elastomers, "stiffened" or otherwise modified constitute some of the best binders available at the present time.

(5) Use chlorinated rubbers, which form rather fluid solutions of around 25% concentration. These rubbers are rather hard and should be plasticized to be used as binders. The plasticized chlorinated rubbers have the best adhesive characteristics of all the rubbers and are rather free of "nerve."

An outstanding example of a satisfactory rubber binder is a mixture of 5% "Vistanex B–12" (a polyisobutylene rubber sold by Advance Solvents and Chemical Corp.) and 4% "Excello" (a carbon black sold by Imperial Oil and Gas Products Co.). This binder belongs to class 4 above. The "Vistanex" itself can be used in high concentration in a non-polar solvent (e.g. low boiling hydrocarbons); neither the "Vistanex" nor hydrocarbon solvents are solvents for the filler. In general it is simplest to add the "Vistanex" solution and the "Excello" separately; they become incorporated during the milling of the propellant. Propellants made with this binder have high compression strengths and excellent resistance to thermal shock. Another rubber binder that has excellent characteristics is neoprene (a polychloro-butadiene) plasticized with 20 to 40% "Santicizer M–17," tricresyl phosphate, "Nevinol" (a partially polymerized p-coumarone indene resin sold by the Neville Co.) or "Hercolyn" (a hydrogenated methyl abietate sold by Hercules Powder Co.).

*Example*

In order more clearly to disclose the nature of the present invention, a specific embodiment will be described in considerable detail. It should be clearly understood, however, that this is done solely for the purpose of illustrating the principles of the present invention by means of a concrete example. Accordingly, the following detailed description is not to be construed as a limitation upon the spirit or scope of the invention as defined in the appended claims. The sequence of steps involved in the process is also shown on the appended drawing illustrating a flow diagram of the process of the present invention.

One of the preferred molding powders of the present invention comprises about 90 to about 95% of a mixture consisting of 40 to 60 parts of finely divided dry potassium nitrate and about 40 to 60 parts of finely divided dry ammonium picrate, compounded with about 5 to about 10% of a binder composed of ethyl cellulose plasticized with one or more chlorinated polyphenyls. When properly compounded, the resulting material has extremely reproducible ballistics, a low temperature coefficient, a low value of the exponential constant $n$, a satisfactorily high specific impulse, a high loading density, and a satisfactory resistance to thermal and mechanical shock.

In producing this propellant composition commercial potassium nitrate is first dried to less than ½% water, and then preferably micropulverized to an average particle size ranging from 10 to 75 microns. The binder comprises a 40–60 mixture of ethyl cellulose and a chlorinated polyphenyl sold by the Monsanto Chemical Company under the trade designation "Aroclor 1254." Another satisfactory binder consists of a 20–50–30 mixture of ethyl cellulose, "Aroclor 1254" and "Aroclor 4465." The binder is preferably used in the form of an acetone solution containing 45 to 75% solids.

About 90 to about 95 parts by weight of the potassium nitrate-ammonium picrate mixture is placed in an edge runner mill along with about 10 to 20 parts by weight of the selected binder solution. The resin is thoroughly mixed with the powdered material, milling being continued at a moderate temperature (e.g., 25–55° C.) for about 2 to 4 hours. To facilitate removal of the volatile solvent a current of gas may be passed over the surface of the material during the milling operation.

After the completion of the milling, the resulting dry, dusty powder is substantially free of the volatile solvent, and has a bulk density of about 0.7 to 1.0. After milling, several batches of the molding powder may be blended if desired by means of a ribbon blender, for example, and the result-mixture may be screened to remove "over sizes" or lumps by passing the powder through a coarse mesh screen.

A predetermined volume or weight of the powder is then placed in the die of a toggle or hydraulic press and subjected to a pressure of from about 10,000 to about 25,000 p.s.i. at a temperature of about 25° to 50° C. for a short period of time. The resulting dense grain as ejected from the mold usually will have a density of about 1.70 to 1.80, a smooth glossy finish, and will normally be free of cracks, the presence of which may be detected by painting the grain with a solution of dye such as gentian violet dissolved in hexane.

The compacted grains, placed in containers (e.g. trays), are then warmed at about 60° C. for about 1 to 2 days. The annealed grains are then allowed to cool.

The grains are then ready for use, either as formed, or after cementing several grains together to form a larger grain, or after coating with a water repellant coating, or with a flame resisting material to form "restricted burning grains." Cementing may be conveniently carried out by applying a coat of cement (e.g., "Glyptal 1201 Cement" a polyhydric alcohol-polybasic acid resin solution of the General Electric Co.) to the surfaces to be joined, pressing the two surfaces together, and maintaining a light pressure on the joined portions. In the case of radial burning grains, cork "washers" may be cemented in place between adjacent grains in order to give the fabricated unit flexibility and shock resistance. Restricted burning grains may be produced by spraying a selected area, such as the bases of a tubular grain, or the base and sides of a cylindrical grain with any commercial coating material containing linseed oil or an alkyd resin (for example "Glyptal No. 1201 Red" a linseed oil polyhydric alcohol-polybasic acid resin of the General Electric Company). The coated surface may then be protected by applying adhesive coated fabric directly over the dry coat. If desired the fabricated grains may be given a water repellant coat with nitrocellulose lacquer containing powdered aluminum and then mounted in the rocket motor, preferably on suitable resilient supports, for example, cork supports.

PROPERTIES OF THE PRESENT PROPELLANTS

Table I summarizes the ballistically important data for several specific compositions made in accordance with the present invention. For purposes of comparison, the corresponding data on Ballistite are given in this table. From the data given in this table it will be apparent that the composite propellants of the present invention possess the advantageous properties characteristic of molded composite propellants as a class. Reference may be made to the above identified Hammett and Thomas application for a detailed statement of these desirable properties.

In addition to their highly advantageous ballistic properties, the propellants of the present invention are characterized by improved physical properties, especially their relatively greater resistance to thermal shock. This property of a propellant is, of course, dependent upon (1) the size of the grain (length and diameter), (2) the severity of the thermal shock, and (3) the presence or absence of insulating material around the grain. If the second and third factors are maintained constant, the relative sizes of various types of grains which fail under a given thermal treatment provide a rough index of their relative resistance to thermal shock. Thus, for example, a 2⅝" diameter grain made in accordance with the above identified Hammett and Thomas application will crack if brought rapidly from −40° C. to +25° C., unless it is kept in an insulated container. In contrast to this low thermal shock resistance, "ECA" type grains in accordance with one of the preferred embodiments of the present invention, have survived a similar thermal shock, without insulation, in grain sizes as high as 8½ inches diameter. If these large diameter ECA grains are subjected to repeated thermal shock, they will occasionally develop cracks. However, certain rubber-containing grains made in accordance with the present invention will survive extreme conditions of thermal cycling even in an 8½" diameter grain size. Thus varying degrees of thermal shock resistance may be obtained by changing the type of binder to be used.

TABLE I.—COMPOSITION AND BALLISTIC PROPERTIES OF TYPICAL EMBODIMENTS

| Sample | Binder | | | | Filler | | | Properties of Finished Propellant | | | |
|---|---|---|---|---|---|---|---|---|---|---|---|
| | Binder Composition (parts by weight) | Binder Solution Used | Percent Binder in Finished Grain | Percent Filler in Finished Grain | Filler Composition (parts by weight) | | | Average Density (g./cc.) | $K_{2000}$[1] | $R_{2000}$[2] | $n$[3] |
| | | | | | Reducing Agent | Oxidizing Agent | | | | | |
| A | 40-60 "Ethocel N-7"[4]-"Aroclor 1254"[5] | 55% Solids in Acetone. | 9 | 91 | Am. Picrate 60 | $KNO_3$ 40 | | 1.721 | 382 | 0.76 | 0.50 |
| B | 20-50-30 "Ethocel N-7"-"Aroclor 1254"-"Aroclor 4465"[6] | 70% Solids in Acetone. | 7 | 93 | Am. Picrate 50 | $KNO_3$ 50 | | 1.780 | 250 | 1.2 | 0.5 |
| C | Same | Same | 7 | 93 | Am. Picrate 60 | $NaNO_3$ 40 | | 1.75 | 338 | 0.85 | 0.50 |
| D | 40-60 "Ethocel N-7"-"Aroclor 1254" | 55% Solids in Acetone. | 10 | 90 | Am. Picrate 80 | $KNO_3$ 20 | | 1.655 | 930 | 0.31 | 0.43 |
| E | 20-50-30 "Ethocel N-7"-"Aroclor 1254"-"Aroclor 4465" | 70% Solids in Acetone. | 5 | 95 | Am. Picrate 30; Al. Bronze 10 | $NaNO_3$ 60 | | 1.80 | 176 | 1.0 | 0.50 |
| F | Same | Same | 10 | 90 | Am. Picrate 10; Nitroguanidine 50 | $KClO_4$ 40 | | 1.81 | 183 | 0.81 | 0.50 |
| G | 60-40 "Neoprene EC-711"[7]-tricresyl phosphate. | 45% Solids in Toluene. | 3 | 97 | Nitroguanidine 60 | $KClO_4$ 40 | | 1.82 | 134 | 0.81 | 0.45 |
| H | 60-40 "Vinylite AYAA"[8]-"Santicizer M-17"[9] | 30% Solids in Acetone. | 7 | 93 | Am. Picrate 50 | $NaNO_3$ 50 | | 1.80 | 288 | 0.62 | 0.45 |
| I | 70-30 "Neoprene EC-711"-tricresyl phosphate. | 45% Solids in Toluene. | 5 | 95 | Am. Picrate 45 | $KNO_3$ 55 | | 1.78 | 180 | 1.7 | 0.40 |
| J | 40-55-5 Nitrocellulose (55½)-Santicizer 8[10]-Centralite. | 70% Solids in Acetone. | 5 | 95 | Am. Picrate 50 | $NaNO_3$ 50 | | 1.78 | 150 | 1.1 | 0.45 |
| K | 40-40-10-10 Nitrocellulose-DINA[11]-"Santicizer M-17"-Centralite. | Same | 5 | 95 | Same | Same | | 1.78 | 132 | 1.4 | 0.45 |
| L | 50-50 "Butvar"[12]-Dibutyl tartrate. | 55% Solids in Ethyl alcohol, Toluene. | 7 | 93 | Same | Same | | 1.80 | 290 | 0.60 | 0.35 |
| M | 70-30 "Ethocel N-7"-Dibutyl tartrate. | 30% Solids in $CHCl_3$ | 7 | 93 | Same | Same | | 1.78 | 208 | 0.85 | 0.45 |
| N | 85-15 "Neoprene KNR"[13]-tricresyl phosphate. | 25% Solids in $CH_2Cl_2$. | 4 | 96 | Am. Picrate 45 | $KNO_3$ 55 | | 1.79 | 200 | 1.90 | 0.35 |
| O | 55-45 "Vistanex B-12"[14]-"Excello"[15] | 50% Solids in pet. ether. | 9 | 91 | Am. Picrate 45 | $KNO_3$ 55 | | 1.76 | 250 | 1.1 | 0.30 |
| P | Same | Same | 9 | 91 | Am. Picrate 60 | $KNO_3$ 40 | | 1.78 | 275 | 1.2 | 0.30 |
| Ballistite | | | | | | | | 1.63 | 202 | 1.13 | 0.73 |

NOTES:
[1] $K_{2000}$ = Area of Burning Surface/Area of Throat to give 2000 p.s.i. equilibrium pressure in a rocket motor.
[2] $R_{2000}$ = Rate of Burning (in./sec.) at 2000 p.s.i.
[3] $n$ = Exponent in the burning law $R = KP^n$.
[4] "Ethocel N-7" = A 7 cps. ethyl cellulose sold by Dow Chemical Co.
[5] "Aroclor 1254" = A chlorinated polyphenyl sold by Monsanto Chemical Company.
[6] "Aroclor 4465" = A chlorinated polyphenyl sold by Monsanto Chemical Company.
[7] "Neoprene EC-711" = A Neoprene base cement sold by Minnesota Mining and Manufacturing Company.
[8] "Vinylite AYAA" = A low viscosity polyvinyl acetate made by the Carbide and Carbon Chemical Company.
[9] "Santicizer M-17" = A methyl phthalyl ethyl glycolate sold by Monsanto Chemical Company.
[10] "Santicizer 8" = A toluene sulfonamide sold by the Monsanto Chemical Co.
[11] "DINA" = bis(nitroxyethyl)nitramine; see the copending application of Wright and Chute, Serial No. 570,813, filed Dec. 30, 1944.
[12] "Butvar" = A polyvinyl acetate butyral sold by Monsanto Chemical Co.
[13] "Neoprene-KNR" = A neoprene polymer sold by E. I. du Pont de Nemours & Co.
[14] "Vistanex-B-12" = A low molecular weight polyisobutylene sold by The Advance Solvents and Chemical Corporation.
[15] "Excello" = A carbon black sold by Imperial Oil and Gas Products Co.

In addition to their improved thermal shock resistance, the preferred embodiments of the present invention exhibit greater impact strength than the prior art molded composite propellants. This improvement is illustrated by the data given in Table II, obtained by testing a standard size grain (1" long, 1" outside diameter, ¼" inside diameter) in a pendulum type of impact apparatus similar to the Izod, the figure given representing the average height of the pendulum fall in inches to break the standard size grain at various temperatures.

TABLE II

| Type and Amount of Binder in the Grain | −40° C. | +25° C. | +60° C. |
|---|---|---|---|
| 9% "Buramine"_____inches__ | (¹) | 4 | 3 |
| 9% ECA_____do____ | 2.5 | 6.5 | |
| 7% ECAS_____do____ | 4.5 | 13 | 10 |
| 9% ECAS_____do____ | 4.5 | 10 | 13 |

¹ Less than 1".

The improved temperature coefficient of compression strength characteristic of the grains containing a rubber binder is illustrated by the data given in Table III.

TABLE III.—COMPRESSION STRENGTHS AT VARIOUS TEMPERATURES

| Type and Amount of Binder in Test Specimen | Compression Strengths in p.s.i. determined on grains 2¾" x ¾" x 1½" at— | | |
|---|---|---|---|
| | −40° C. | 25° C. | 60° C. |
| 9% "Buramine" a urea-formaldehyde resin solution in toluene_____ | 11,500 | 6,000 | 3,000 |
| 9% "Ethocel N-7", "Aroclor-1254" (50-50)_____ | 12,000 | 6,300 | 2,500 |
| 4% "Vistanex"+3% Excello_____ | 10,000 | | 3,500 |
| 3% "Vistanex"_____ | 10,500 | 6,000 | 4,000 |

From these data it will be noted that the grains made with a rubber binder have a smaller temperature coefficient of impact strength. Furthermore, at low temperatures (−40° C.), grains of the first two types failed by shattering whereas at the higher temperatures they failed by a conical fracture. Grains made with the rubber binders, however, failed by conical fracture over the whole temperature range from −40° C. to 60° C.

Another significant advantage of the present invention arises from the fact that the preparation of the molding powder is much more readily accomplished because (a) the solvents utilized are very volatile and (b) the milling of the composition need not be interrupted after the solvent content reaches a certain minimum value. In other words, the molding powder of the present invention need not contain any appreciable quantity of solvent in order to mold satisfactorily. Furthermore, the molded grains of the present invention require only one or two days annealing at a moderate temperature, in order to permit the dimensional changes to attain substantial completion, in contrast to the ten or twelve days of cure required by grains prepared from thermosetting resinous binders.

From the foregoing detailed description it will be apparent that the composite propellants of the present invention are characterized by numerous highly advantageous properties. Moreover, it will be evident to those skilled in the art that many variations and modifications may be made in the composition of the product, in the methods of fabrication, and in other respects, without departing from the spirit and scope of the invention. We therefore intend to be limited only in accordance with the appended patent claims.

We claim:
1. A composite propellant for jet propulsion purposes, consisting of a dense, preformed rigid body essentially composed of a compacted mixture of about 40 to about 60 parts of ammonium picrate, about 40 to about 60 parts of an alkali metal nitrate and about 3 to about 20 parts of a binder consisting of ethyl cellulose plasticized with from 20% to 80% by weight of said binder of a chlorinated polyphenyl.

2. In the production of a molded composite propellant the improvement which includes the steps of (a) providing an intimate mixture of from 40 to 60 parts of a finely divided solid oxidizing agent selected from the group consisting of sodium nitrate, potassium nitrate and potassium perchlorate, from 40 to 60 parts of ammonium picrate, (b) incorporating with said mixture a solution in a volatile liquid of from 3% to about 20% of a binder comprising ethyl cellulose and a chlorinated polyphenyl, (c) milling said mixture at a temperature of from 25° C. to 55° C. until said volatile liquid is substantially completely removed therefrom and a substantially dry molding powder is obtained, (d) compressing a predetermined amount of said powder in a mold at a pressure of between 10,000 and 25,000 p.s.i. to form a compacted, dense, self-supporting solid body, (e) then annealing said compacted body by maintaining the same at a temperature of about 60° C. for a period of from 1 to 2 days, whereby to obtain a compression molded composite propellant characterized by improved resistance to thermal shock.

3. A composite propellant consisting of a dense, rigid body essentially composed of a compact, intimate mixture of 40 to 60 parts of finely divided particles of a solid, oxidizing agent selected from the group consisting of sodium nitrate, potassium nitrate and potassium perchlorate and from 40 to 60 parts of particles of a finely divided, solid reducing agent selected from the group consisting of ammonium picrate and nitroguanidine, the particles of the respective components of said mixture being suspended in a matrix consisting of a mixture of ethyl cellulose and from 20% to 80% by weight of a chlorinated polyphenyl, the matrix being present in said body in amount of from 3% to 20% by weight of said body.

4. A composite propellant consisting of a dense, rigid body essentially composed of a compact, intimate mixture of 40 to 60 parts of particles of potassium nitrate having an average particle size of from 10 to 75 microns and from 40 to 60 parts of finely divided particles of ammonium picrate, the particles of the respective components of said mixture being suspended in a matrix consisting of a mixture of ethyl cellulose and from 20% to 80% by weight of a chlorinated polyphenyl, the matrix being present in said body in an amount of 3% to 20% by weight of said body and said body having a density between 1.70 and 1.80.

References Cited in the file of this patent

UNITED STATES PATENTS

| 363,224 | Gerhard | May 17, 1887 |
| 2,004,436 | Jaeger | June 11, 1935 |
| 2,165,263 | Holm | July 11, 1939 |
| 2,195,965 | Holm | Apr. 2, 1940 |
| 2,365,170 | Bitting | Dec. 19, 1944 |
| 2,434,872 | Taylor | Jan. 20, 1948 |

FOREIGN PATENTS

| 10,722 | Great Britain | 1888 |
| 6,258 | Great Britain | 1892 |
| 25,711 | Great Britain | 1896 |
| 9,062 | Great Britain | 1899 |
| 21,529 | Great Britain | 1905 |
| 338,848 | Germany | July 4, 1921 |

UNITED STATES PATENT OFFICE
CERTIFICATE OF CORRECTION

Patent No. 3,014,796 December 26, 1961

Franklin A. Long et al.

It is hereby certified that error appears in the above numbered patent requiring correction and that the said Letters Patent should read as corrected below.

In the heading of the drawing, line 3, and in the heading to the printed specification, line 3, in the title of invention, for "POLYPHENOLS", each occurrence, read -- POLYPHENYLS --.

Signed and sealed this 5th day of June 1962.

(SEAL)
Attest:

ERNEST W. SWIDER
Attesting Officer

DAVID L. LADD
Commissioner of Patents